United States Patent [19]

Fricke et al.

[11] Patent Number: 4,947,938

[45] Date of Patent: Aug. 14, 1990

[54] HOLE CUTTER FOR GOLF COURSE GREENS

[76] Inventors: James E. Fricke, R.D. 1, Box 59, Denver, Pa. 17517; Ivan L. Stoltzfus, 124 Meadow Creek Rd., New Holland, Pa. 17557

[21] Appl. No.: 222,063

[22] Filed: Jul. 8, 1988

[51] Int. Cl.⁵ .................. E21B 12/06; A01B 45/00
[52] U.S. Cl. ........................... 172/22; 172/25; 172/430; 74/424.8 A
[58] Field of Search .............. 172/21, 22, 25, 110, 172/111, 522, 533, 125, 19, 20, 41; 175/20, 202, 313; 74/424.8 A; 294/50.5, 50.7

[56] References Cited

U.S. PATENT DOCUMENTS

| | | | |
|---|---|---|---|
| 3,163,455 | 12/1964 | Tuggle, Sr. ................. | 294/50.7 X |
| 3,416,831 | 12/1968 | Bishop et al. ............... | 294/50.5 |
| 3,444,938 | 5/1969 | Ballmann ..................... | 175/313 X |
| 3,733,914 | 5/1973 | Sheesley ..................... | 74/424.8 A X |
| 3,817,337 | 6/1974 | Panak et al. ................. | 172/22 X |
| 4,023,431 | 5/1977 | Pavlas ......................... | 74/424.8 A |
| 4,057,114 | 11/1977 | Anderson ..................... | 172/41 X |
| 4,204,577 | 5/1980 | Bittle ........................... | 294/50.7 X |
| 4,763,735 | 8/1988 | Gay .............................. | 172/22 X |
| 4,884,638 | 12/1989 | Hoffman ....................... | 172/430 X |

FOREIGN PATENT DOCUMENTS 0598741   5/1978   Switzerland .................. 172/41

Primary Examiner—Randolph A. Reese
Assistant Examiner—Jeffrey L. Thompson

[57] ABSTRACT

A machine for cutting holes in golf course greens having a threaded drive shaft, a motor to rotate the drive shaft, a sod cutter at the bottom of the drive shaft and adapted to rotate with the drive shaft, a clutch that can be engaged and disengaged with the threads on the drive shaft, the clutch mounted on the upper end of an ejector cylinder concentrically encasing the drive shaft and adapted to effectively move downwardly when the clutch is engaged and to float free when the clutch is disengaged, supports for the plug ejector cylinder which allow the ejector cylinder to move along the axis of the drive shaft, and an ejector plate mounted at the bottom of the drive shaft and adapted to fit inside the cutter and to effectively move downwardly through the interior of the cutter when the clutch is engaged, in order to drive out the plug of turf and dirt inside the cutter.

5 Claims, 3 Drawing Sheets

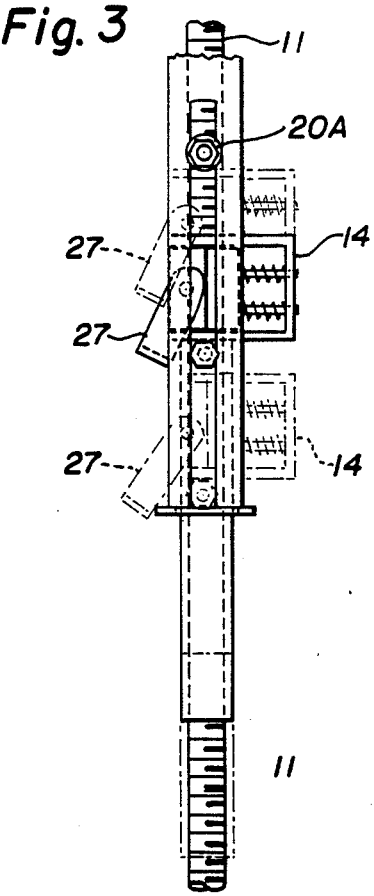
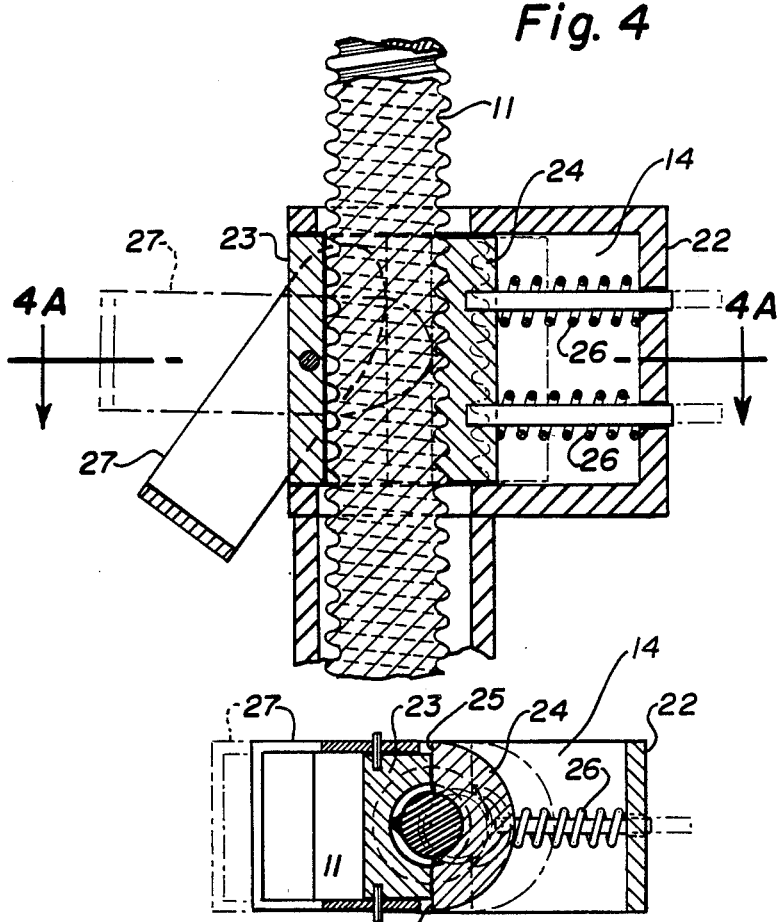
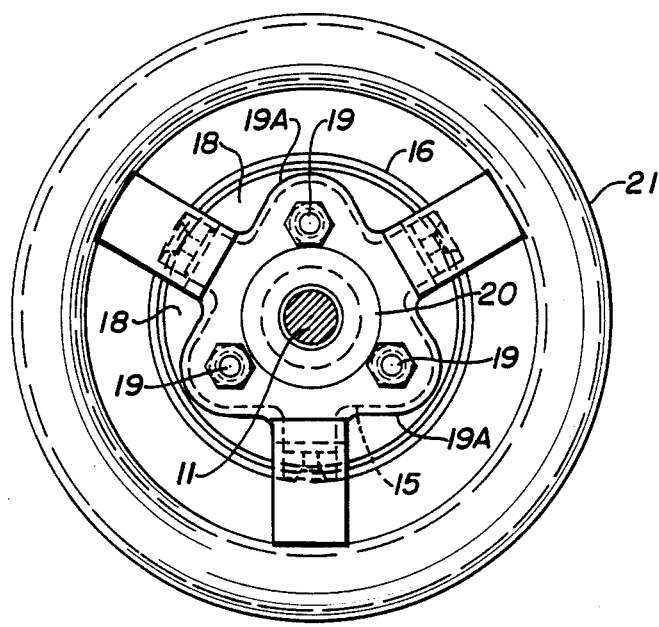

HOLE CUTTER FOR GOLF COURSE GREENS

BACKGROUND OF THE INVENTION

The invention relates to a mechanized device for cutting holes in golf course greens. The hole, often called a cup, in a green is frequently moved from one position on the green to another, sometimes on a daily basis. The hole is cut, the metallic or plastic liner for the hole adapted to hold the pole of the flag bearing the number of that particular green is then placed in the newly cut hole. The plug of turf and dirt from the newly cut hole is then placed in the hole from which the metal cup liner has been removed. A skillful greenskeeper can accomplish this task called "recupping" in such a way that it is practically impossible to see the former hole. Most, if not all, of the hole cutting devices in use today are manual. A person stands in front of the manual hole cutter and twists the device in a reciprocal, back and forth manner to sink the cutter into the green to the proper depth. The proper depth is 8 inches. The greenskeeper accomplishes this task by first taking a 4 inch plug, including the sod section, and ejecting it from the cutter with a manually operated foot or hand lever of some kind. A second 4 inch dirt plug is then removed in the same manner. The reason this is a two-step process is that in many cases the soil characteristics of the newly cut plug are such that it is difficult, if not impossible, to drive an 8 inch plug out of the cutter and into the old hole. Holes in greens measure 7 inches by 4¼ inches in diameter, but manually operated devices often make it necessary to take two cuts about 3 or 4 inches deep in order to drive the plug from the cutter. One of the objects of the present invention is to enable the greenskeeper to cut a new hole in a single bite. The holes in putting greens as opposed to the holes in the regular greens on the fairway are often only 5 inches deep and thus do not present as much of a problem as do the holes in the regular greens. In any case, holes in putting greens are not moved as frequently as they are on regular greens.

U.S. Pat. No. 3,817,337 to panak and Bronson describes a hydraulic driven machine for making holes in greens, including means to eject a plug of turf and dirt from the cutting cylinder. The machine described in the present application is simpler, more portable, eliminates the need for hydraulic hoses, and utilizes a simple clutch to drive out the plug from the cylindrical cutter.

SUMMARY OF THE INVENTION

The machine for cutting holes in golf course greens according to the present invention includes a threaded drive shaft having a motor mounted at the upper end and a plug cutter mounted at the lower end of the drive shaft. The motor may be gasoline, electric, or hydraulic. The sod cutter mounted at the bottom of the drive shaft will be toothed appropriate to cut through the turf and soil of the green. A plug ejector cylinder concentrically encases the threaded drive shaft and is supported by a fixed vertical frame member which may be mounted to the motor support. The plug ejector cylinder carries a fixed clutch at the top thereof, the clutch adapted to engage and disengage the threads on the drive shaft. When the clutch is engaged, the threaded drive shaft moves upward through the ejector cylinder pulling the plug cutter upwardly. When the clutch is disengaged, the plug ejector cylinder floats free as the threaded drive shaft rotates freely inside the plug ejector cylinder and moves downwardly, driving the cutter into the ground. The bottom of the plug ejector cylinder will normally rest on a floating thrust bearing which rides on a mounting member for the cutter. As the cutter sinks into the green, the threaded drive shaft being disengaged from the plug ejector cylinder, will move downwardly. The top of the clutch, or other portion of the plug ejector cylinder, will move up and finally hit against depth control stops which may consist simply of the heads of sturdy bolts positioned on the vertical frame member. In this manner, as the cutter is driven into the soil, the plug ejector cylinder effectively rides upward until striking the depth control stops at a position appropriate to maintain the depth of the cut into the soil at the appropriate 7 inches.

The machine is then physically lifted upward to remove the plug of turf and soil retained inside the cutter. The cutter is then inserted into the old hole, the clutch is engaged, and the threaded drive shaft moves upwardly pulling the cutter out of the hole. The ejector plate holds the plug in the hole and effectively lifts the whole machine upwardly. Thus, the plug is driven out of the cutter and left in the old hole.

BRIEF DESCRIPTION OF THE DRAWINGS

FIG. 3 is a detail elevation view taken on the line 3—3 of FIG. 1 showing a stop bolt adjustment at the top of the slot in the fixed vertical frame member that supports the plug ejector cylinder. The clutch, in this case a split-nut clutch is shown engaged in phantom lines and in an intermediate position in solid lines.

FIG. 4 is a detailed sectional view taken on the line 4—4 of FIG. 1 showing the split-nut clutch with the clutch lever in engaged position in solid lines and in off position in phantom lines.

FIG. 4A shows details of the split-nut clutch taken along lines 4A—4A of FIG. 4.

FIG. 5 is a sectional view taken on the line 5—5 of FIG. 1 showing the spider-like arrangement of the plug expelling push rods and also showing a foot ejector ring.

FIGS. 6–10 show the sequence of:

FIG. 6 ready to drill.

FIG. 7 drilled to depth gauge limit.

FIG. 8 stopped drilling and pulled plug out of hole.

FIG. 9 inserted plug in old hole to be filled and engaged pusher clutch, and

FIG. 10 run motor to effectively screw plug ejector cylinder down to effect extraction of the tool from the hole while leaving the plug behind.

DETAILED DESCRIPTION OF PREFERRED EMBODIMENTS

Figure 1:
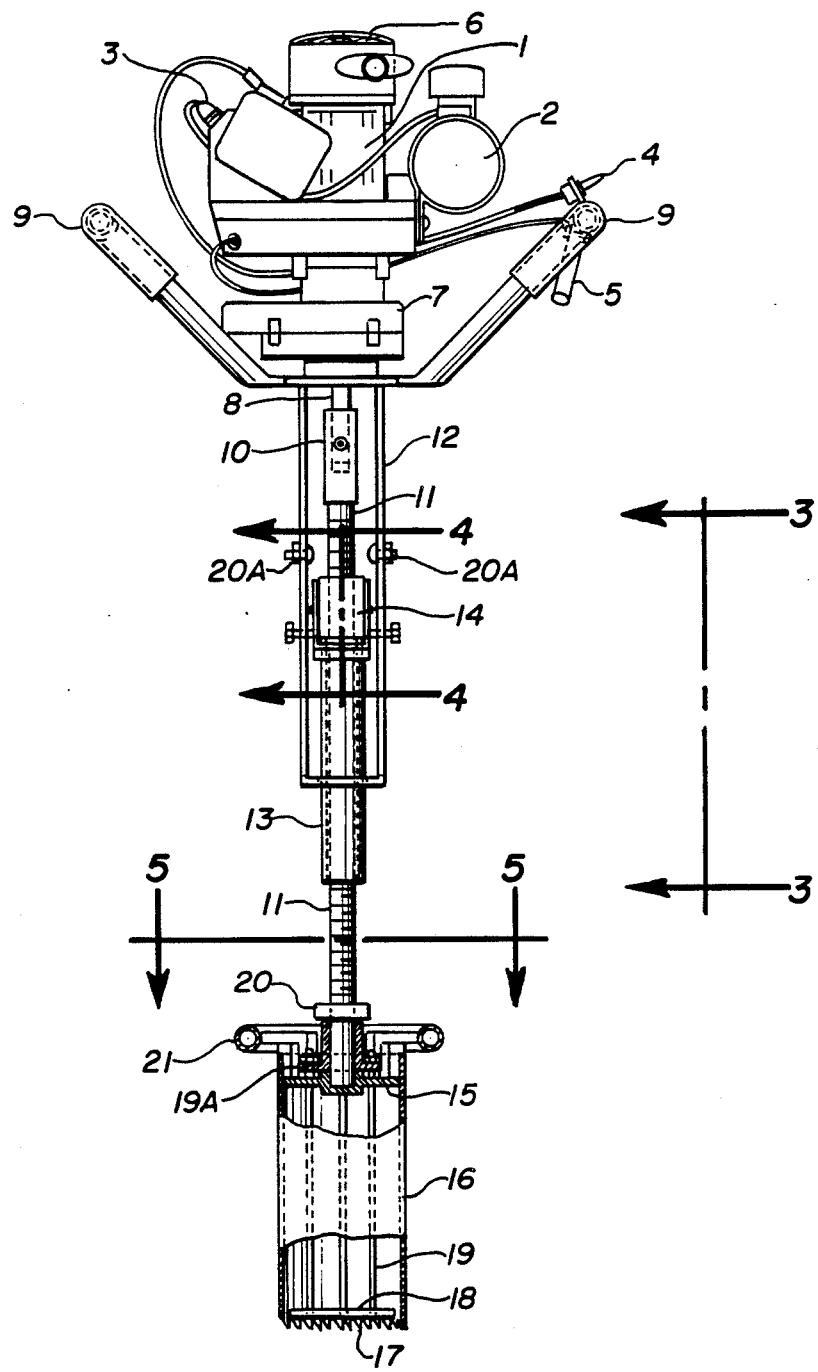
FIG. 1 is a side elevation view with a part of the cutter cylinder broken away to show internal parts.
Figure 2:
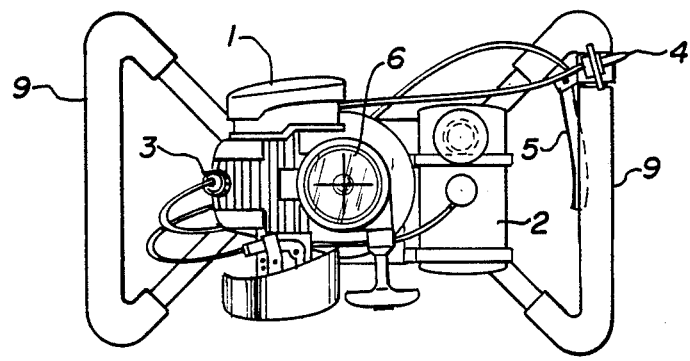
FIG. 2 is a top plan view of FIG. 1.
Figure 10:
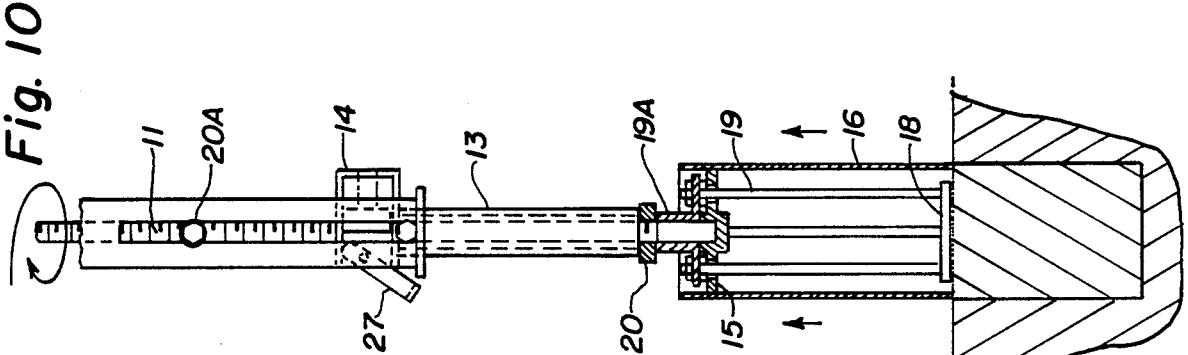

Referring to FIG. 1, the machine is powered by a gasoline motor 1 having a gas tank 2, a spark plug 3, a starter 4, and a throttle 5. As shown, the motor 1 has mounted on the top thereof a bubbler level 6 in order that the hole may be drilled in a true vertical direction, even if the putting green slopes at the point where the new hole is to be positioned. The output of the motor 1 goes into a reduction gear box 7 from which emerges the gear box output shaft 8. Handles 9 enable the operator to lift and carry the entire machine. A coupling 10 connects the gear box output shaft 8 with the threaded drive shaft 11. Vertical frame member 12 supports the motor 1 and extends downwardly as shown around the threaded drive shaft 11. The plug ejector cylinder 13 concentrically encases the threaded drive shaft 11 and has the clutch 14 mounted at the top thereof. The system including the plug ejector cylinder 13 and the clutch 14 is adapted to be driven downwardly along the threaded drive shaft 11 when the clutch 14 is engaged and to ride free when the clutch 14 is not engaged.

The bottom of the threaded drive shaft 11 is permanently mounted on the cutter shaft mounting member 15 in order that the cutter 16 bearing cutter teeth 17 always rotates with the threaded drive shaft 11. The ejector plate 18 is adapted to fit inside the cutter 16 and move up and down therein, depending on whether the clutch 14 is engaged or disengaged. The ejector plate 18 is permanently affixed to the plug expelling push rods 19 mounted on push rod mount 19A. The bottom of plug ejector cylinder 13 normally rests against a thrust bearing 20 as the hole is cut. The ejector plate 18, resting on the turf, rises inside the cutter 16 driving the plug ejector cylinder 13 in an upwardly direction until the top of the clutch 14 strikes the depth control stops at 20A thus preventing the cutter 16 from penetrating any further into the soil. These features are easier to understand by referring to FIGS. 6–10 inclusive. A foot ejector ring 21 is mounted on the plug expelling push rods 19 and serves as an additional plug expelling means should such be needed. The foot ejector ring 21 may also serve as a protective device to minimize the possibility of the operator's clothing becoming fouled in the rapidly spinning cutter 16 and associated parts.

Referring to FIGS. 3 and 4, the clutch 4 is made up of the clutch housing 22 which houses a split-nut clutch comprised, as shown best in FIG. 4A, of two halves 23 and 24 of a nut adapted, on the clutch 14 as engaged, to engage the threads on the threaded drive shaft 11. The half-nut 23 has no threads and is permanently mounted in the housing 22, while the half-nut 24 has threads and extended shoulders 25 and is adapted to engage and disengage the threaded drive shaft 11. The clutch spring 26 drives the half nut 24 to engage the threaded drive shaft 11 when the clutch lever 27 is down, which is the engaged position. Clutch lever 27 is shown in FIG. 4 in solid lines in the engaged position, since the clutch springs 26 now drive the half-nut 24 against the threads on the threaded drive shaft 11. To disengage the clutch 14, the clutch lever 27 is positioned as shown in phantom lines in FIG. 4 and 4A and which pushes against the shoulders 25, on half-nut 24, thus compressing the clutch spring 26 and disengaging the half-nut 24 from the threaded drive shaft 11. In FIG. 5, a view along the line 5—5 of FIG. 1, there is shown the foot ejector ring 21, the tops of the plug expelling push rods 19, the cutter 16, and the ejector plate 18.

Figure 9:
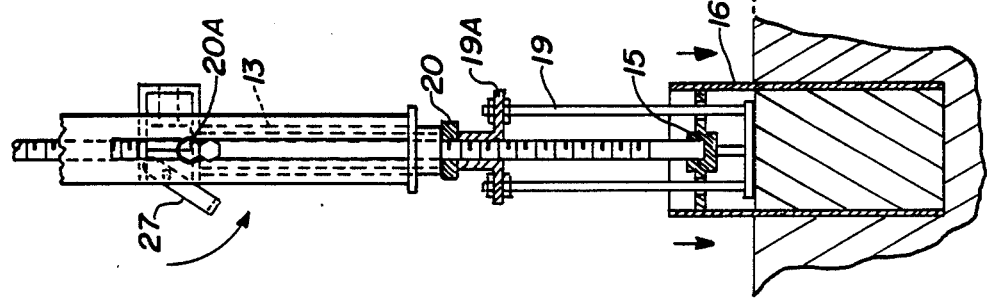
Figure 8:
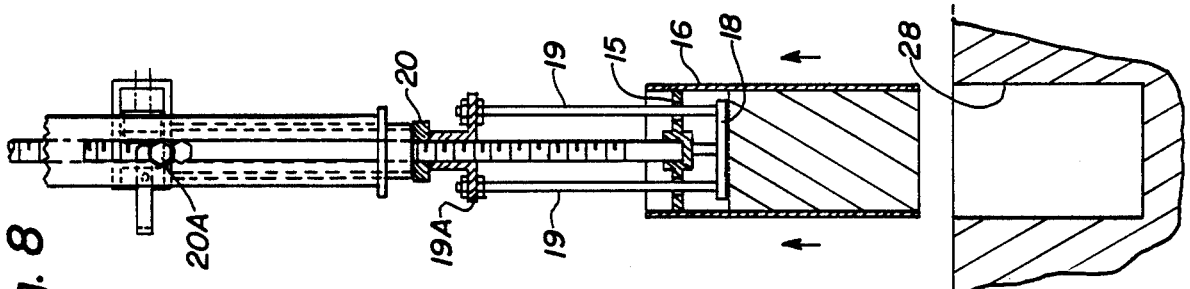
Figure 7:
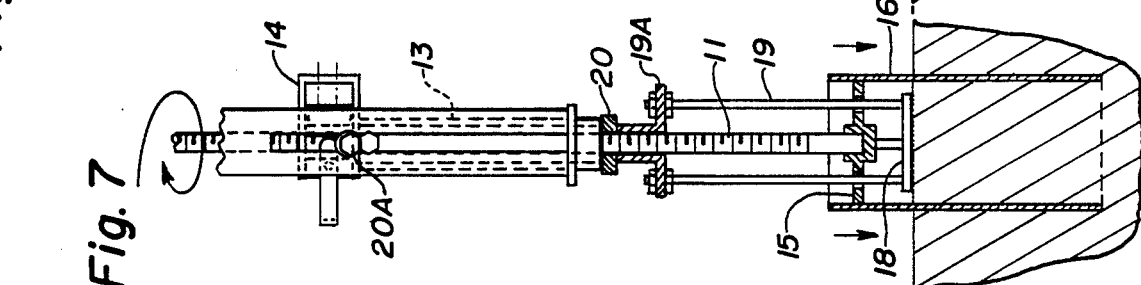
Figure 6:
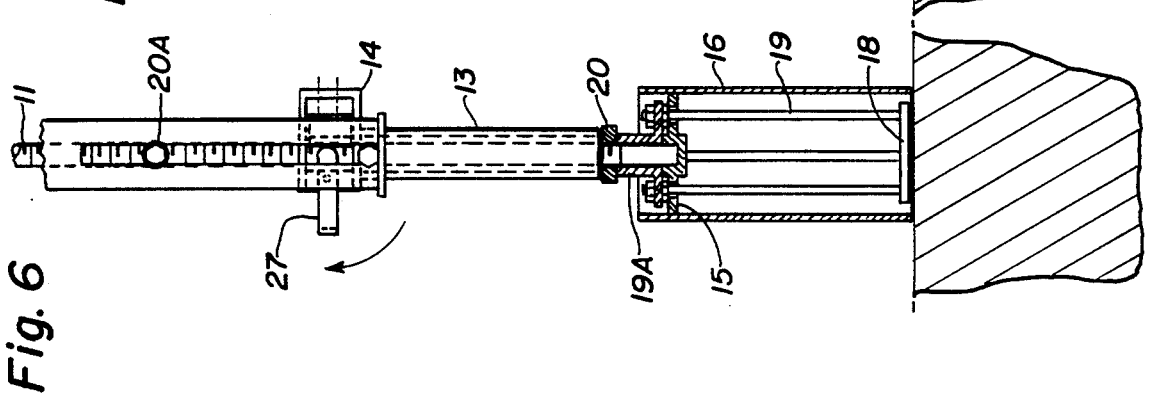

FIG. 6 shows the plug cutting machine of the present invention in position to begin cutting. The clutch lever 27 is in the unengaged position so that the plug ejector cylinder 13 and the clutch 14 ride freely over the threaded drive shaft 11. The plug ejector cylinder 13 rides on the thrust bearing 20. The ejector plate 18 rests on the top of the turf connected to the plug expelling push rods 19 which are affixed to push rod mount 19A. FIG. 7 shows the plug completely cut. The cutter 16 has cut into the turf and the plug ejector plate 18 remains on the surface of the turf. The cutter 16, driven by the threaded drive shaft 11, sinks into the soil while the thrust bearing 20 and the plug ejector cylinder 13 remain in substantially the same postion. This results in the fact that the clutch 14 comes in contact with the depth control stop 20A as the cutter 16 sinks into the soil. Hence, in FIG. 7, the machine has sunk as far into the soil as possible As shown on FIG. 8, the entire system is simply lifted out of the hole 28, carried to the old hole to be refilled with the newly cut plug, and inserted in the old hole as shown in FIG. 9. The clutch lever 27 is now illustrated in the engaged position. It is this position that allows the clutch springs 26 as shown on FIG. 4 to drive the split nut 24 into engagement with the threaded drive shaft 11. After the clutch 14 has been engaged with the threaded drive shaft 11 as shown on FIG. 10, the engaged clutch 14 and the plug ejection cylinder 13 are pressed in a downwardly direction against the thrust bearing 20 which holds the ejector plate 18 on the plug while the cutter 16 is drawn up out of the ground by the forces exerted on the plug by the ejector plate 18.

While the preferred embodiments have been described above, it will be appreciated that alternate means, such as a clutch different from the split-nut clutch described herein, or a 12-volt electric motor may be utilized without departing from the spirit and scope of the invention.

What is claimed is:

1. A machine for cutting holes in golf course greens comprising in combination:
    (a) a threaded drive shaft;
    (b) a motor adapted to rotate the drive shaft and positioned at the top end of the drive shaft;
    (c) a sod cutter mounted at the bottom of the drive shaft and adapted to rotate with the drive shaft and cut a plug of soil from a golf green;
    (d) a clutch adapted to engage and disengage the threads on the threaded drive shaft;
    (e) an ejector plate adapted to fit inside said cutter and to press against said plug when said clutch is engaged, whereby said threaded drive shaft forces said cutter out of the hole while leaving the cut plug behind;
    (f) an elongated plug ejector cylinder concentrically encasing the drive shaft and having said clutch mounted on the upper end of said cylinder, said clutch and said ejector cylinder adapted to apply pressure against said ejector plate and force said drive shaft to move upwardly when the clutch is engaged to said threaded drive shaft and to float free when said clutch is disengaged; and
    (g) a vertical frame member fixed with respect to the motor adapted to support the plug ejector cylinder as said drive shaft moves up and down along the axis of said plug ejector cylinder.

2. The machine according to claim 1 wherein said motor is a gasoline motor.

3. A machine according to claim 1 having a leveler mounted at the top of said motor for maintaining said machine plumb.

4. A machine according to claim 1 wherein said clutch is a split-nut clutch.

5. A machine according to claim 1 having depth control stops mounted in said fixed vertical frame member.

* * * * *